US012705498B2

(12) United States Patent
Bean et al.

(10) Patent No.: US 12,705,498 B2
(45) Date of Patent: Aug. 11, 2026

(54) SYSTEMS AND METHODS FOR FEDERATED VALIDATION OF MODELS

(71) Applicant: Capital One Services, LLC, McLean, VA (US)

(72) Inventors: Kenny Bean, Herndon, VA (US); Jeremy Goodsitt, Champaign, IL (US); Michael Davis, Arlington, VA (US); Taylor Turner, Richmond, VA (US); Tyler Farnan, San Diego, CA (US)

(73) Assignee: Capital One Services, LLC, McLean, VA (US)

( * ) Notice: Subject to any disclaimer, the term of this patent is extended or adjusted under 35 U.S.C. 154(b) by 860 days.

(21) Appl. No.: 18/063,438

(22) Filed: Dec. 8, 2022

(65) Prior Publication Data

US 2024/0193432 A1 Jun. 13, 2024

(51) Int. Cl.
*G06N 3/098* (2023.01)

(52) U.S. Cl.
CPC .................................... *G06N 3/098* (2023.01)

(58) Field of Classification Search
CPC ............................... G06N 3/098; G06N 20/00
See application file for complete search history.

(56) References Cited

U.S. PATENT DOCUMENTS 9,503,466 B2 11/2016 Vasseur et al.
2024/0111903 A1* 4/2024 Moran ................... G06N 3/044

FOREIGN PATENT DOCUMENTS

WO WO-2021108796 A2 * 6/2021 ............. G06N 3/045

OTHER PUBLICATIONS

Matsuda et al., FedMe: Federated Learning via Model Exchange, Oct. 2021 (Year: 2021).*
Brownlee, Train-Test Split for Evaluating Machine Learning Algorithms, Aug. 2020 (Year: 2020).*
Julian, Creating a Validation Column (JMP Pro), Dec. 2021 (Year: 2021).*
Yang et al., Applied Federated Learning: Improving Google Keyboard Query Suggestions, Dec. 2018 (Year: 2018).*
Joseph et al., SPlit: An Optimal Method for Data Splitting, Mar. 2021 (Year: 2021).*
Zhao et al., Blockchain-based decentralized federated learning: A secure and privacy-preserving system, 2021 (Year: 2021).*
Liu et al., A Secure Federated Learning Framework for 5G Networks, Aug. 2020 (Year: 2020).*

* cited by examiner

*Primary Examiner* — Tamara T Kyle
*Assistant Examiner* — Jacqueline C. Meyer
(74) *Attorney, Agent, or Firm* — Foley & Lardner LLP

(57) ABSTRACT

Methods and systems described herein for validating machine learning models in federated machine learning model environments. More specifically, the methods and systems relate to unloading training and validation techniques to client devices using newly collected data to improve accuracy of federated machine learning models.

20 Claims, 7 Drawing Sheets

200

202 204

| Parameters # | Values |
|---|---|
| <Parameter 1> | 0.45 |
| <Parameter 2> | 2.00 |
| <Parameter 3> | 0.55 |
| <Parameter 4> | 0.75 |
| <Parameter 5> | 1.10 |
| ⋮ | |
| <Parameter 100> | 0.25 |

| **Parameter 1** | **Weight** |
|---|---|
| <Parameter> | 0.45 |
| <Parameter> | 2.00 |
| <Parameter> | 0.55 |
| <Parameter> | 0.75 |
| <Parameter> | 1.10 |

| Average Parameter | Average Weight |
|---|---|
| <Aggregated Parameter 1> | 0.97 |

| Flag | Entry |
|---|---|
| True | <Data 1> |
| False | <Data 2> |
| False | <Data 3> |
| False | <Data 4> |
| False | <Data 5> |

| Device ID | Performance Score |
|---|---|
| <Identification Data> | 90% |

SYSTEMS AND METHODS FOR FEDERATED VALIDATION OF MODELS

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Federated machine learning is a machine learning technique in which the algorithm trains across multiple decentralized edge devices with local data samples without sending training data back to a central training server. This allows client devices to train a shared machine learning model while keeping all the training data local. Each client device downloads the shared machine learning model and retrains or updates the model using local training data. Each device then sends an updated set of model parameters to the cloud (e.g., a central system), wherein it is merged with other client device updates to improve the shared model. However, federated machine learning is not without challenges. In particular, machine learning model validation is still performed at a central location using a "golden" dataset. Thus, the validation process is done on a static (e.g., a stale old dataset) possibly yielding inaccurate validation results. For example, validation results may indicate that the updated machine learning model is not performing well because the validation data is not new enough and/or overfitted for older training data. Furthermore, the current validation technique may require sending sensitive user data between the client device and the cloud thereby exposing the data to malicious individuals. In addition, when the sensitive user data is received by a cloud system, that data may have to be anonymized or otherwise cleaned of user identifying information such as names, addresses, etc. That process requires resources and time to complete.

SUMMARY

Accordingly, methods and systems are described herein for novel uses and/or improvements to federated machine learning techniques and in particular to validation of a trained and updated machine learning model. As discussed above, current validation methods include usage of a "golden dataset" that is used to validate updated machine learning models at a central location. Thus, existing systems allow for processes that lead to validating machine learning models using static outdated datasets and to security risks to that data during transit. To overcome these technical deficiencies in adapting federated learning for this practical benefit, methods and systems disclosed herein enable validation of machine learning models locally on client devices using newly collected data. Thus, the newly collected validation data does not need to be sent back to a central location resulting in machine learning models having more accurate validation results and better validation efficiency.

In some aspects, the problems described above may be solved using a validation system that may perform the following operations. The validation system may receive the results of training performed at each client device. In particular, the validation system may receive from a plurality of client devices, a plurality of sets of machine learning model data. The machine learning model data in each set may include corresponding updated model parameters resulting from training each machine learning model at a corresponding client device using a training dataset stored at each corresponding client device of the plurality of client devices. For example, each client device may host a machine learning model. Some examples of machine learning models may include malicious code detection models, malicious message detection models, etc. Although each machine learning model may perform the same function, the machine learning models may be trained using data on each client device. Thus, each client device may have a machine learning model tuned to the data on that client device. The validation system may transmit a command to each client device to train a corresponding machine learning model. Each client device may train each corresponding machine learning model and transmit the results (e.g., model parameters updated as a result of training) to the validation system.

The validation system may aggregate each set of the updated model parameters into an aggregated set of model parameters. In particular, the validation system may in response to receiving the plurality of sets of the machine learning model data, combine each set of the updated model parameters into an aggregated set of model parameters. The updated model parameters in each set may include the aggregated results from training and may be used to update the machine learning model corresponding to each client device. The combination of parameters may be performed using a particular function or algorithm (e.g., weighted average based on the amount of data processed by each client device). For example, the validation system may receive results (e.g., a set of machine learning model weights) from each of a thousand client devices, each running a machine learning model that detects malicious code. The validation system may then aggregate the like parameters (e.g., weights for a particular portion of the machine learning model) into one value to be pushed out to each client device as an updated parameter for the machine learning model.

The validation system may transmit, to client devices, requests to update corresponding machine learning models. In particular, the validation system may transmit to each client device a first request to update a corresponding machine learning model using the aggregated set of model parameters. As a result, the machine learning model corresponding to each client device may be updated with the results from the training algorithm. To continue with the example above, the validation system may aggregate each parameter and then transmit the aggregated values to each client device so that each machine learning model residing on those client devices is updated using those updated parameters.

The validation system may request that each client device validate the machine learning model using a validation dataset. In particular, the validation system may in response to receiving a confirmation from each client device that the corresponding machine learning model has been updated, transmit a second request to each client device to validate the machine learning model using a validation dataset local to each client device. Each client device may validate the corresponding machine learning model using a corresponding validation dataset. As a result, each machine learning model corresponding to each client device may be validated. For example, the validation system may request that each client device validate a malicious code detection system residing on each device. That is, the validation system may instruct each device to test the new updated machine learning model.

In some embodiments, the validation system may have previously sent a command to a client device to split potential training data into two groups—training data and validation data. In particular, the validation system may have transmitted to each of the plurality of client devices a first command to split training data into a training dataset and the validation dataset. The first command may include a number of command parameters. For example, the command may include a ratio of data to be assigned to the training dataset and the validation dataset. The command may also include a flag for insertion into the training data to mark a portion of the training data as validation data. That is, if the training data is stored in a database on each client device, the validation system may insert a flag into the database for each entry indicating whether the entry should be used for training or validation.

In some embodiments, the validation system may flag portions of data to skip when selecting training data. In particular, the validation system may transmit, to each client device in the plurality of client devices, a second command to train the corresponding machine learning model using the training dataset. The second command may include the flag for indicating the portion of the training data to skip during training. That is, the split may be performed as part of the training command and the data to be skipped may be indicated within the command. For example, the command may indicate to mark twenty percent of the training data for validation and not use it for training.

The validation system may receive a performance score from each client device. In particular, the validation system may in response to the second request receive a corresponding performance score from each client device. Each performance score may indicate an accuracy level of the corresponding machine learning model. For example, each performance score may be generated locally on each client device and may indicate how well the machine learning model is performing with the updated parameters.

The validation system may revert the updated model parameters to the original set of parameters based on performance scores. In particular, the validation system may, in response to determining that a first machine learning model corresponding to a first client device is associated with a performance score lower than a threshold, revert a corresponding set of updated model parameters to an original set of model parameters. For example, as part of the validating an updated malicious code detection machine learning model, each client device may execute a validation process using a validation data (e.g., run the validation data through the machine learning model). The scores may then be sent to the validation system. The validation system may compare the scores (e.g., to a threshold) and determine whether those scores indicate that the machine learning model is performing worse than a threshold and/or worse than prior to updating the parameters.

In some embodiments, the validation system may maintain performance scores from different model updates (e.g., the last model update). The validation system may request those scores and compare the scores to the new scores to determine whether to revert each machine learning model to a prior version. In particular, the validation system may, prior to receiving from the plurality of client devices, the plurality of sets of machine learning model data, transmit a request, to each of the plurality of client devices, for a corresponding original performance score. Each original performance score may indicate a performance level of the corresponding machine learning model at the corresponding client device. For example, the original performance score may be a score associated with the last version of the machine learning model (e.g., prior to update). The validation system may then set, for each client device, the threshold to the corresponding performance score. That is, the threshold may be the previous performance score. The validation system may then compare, for each client device of the plurality of client devices, the corresponding original performance score with the corresponding performance score for each client device and determine, for each client device, whether the corresponding performance score is lower than the threshold. For example, the threshold (e.g., a previous performance score) may be ninety-five percent. Thus, if the new performance score is lower than 95% (e.g., by a certain number) then the validation system may cause the machine learning model to be reverted to previous parameters.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates a table of parameters and the weight associated with each parameter used for receiving machine learning model data, in accordance with one or more embodiments.

FIG. 3 illustrates a process of aggregating model parameters for updating the machine learning model, in accordance with one or more embodiments.

FIG. 4 illustrates a table of exemplary data used for flagging a dataset for validating the machine learning model, in accordance with one or more embodiments.

FIG. 5 illustrates a table of performance scores used for comparing performance scores, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
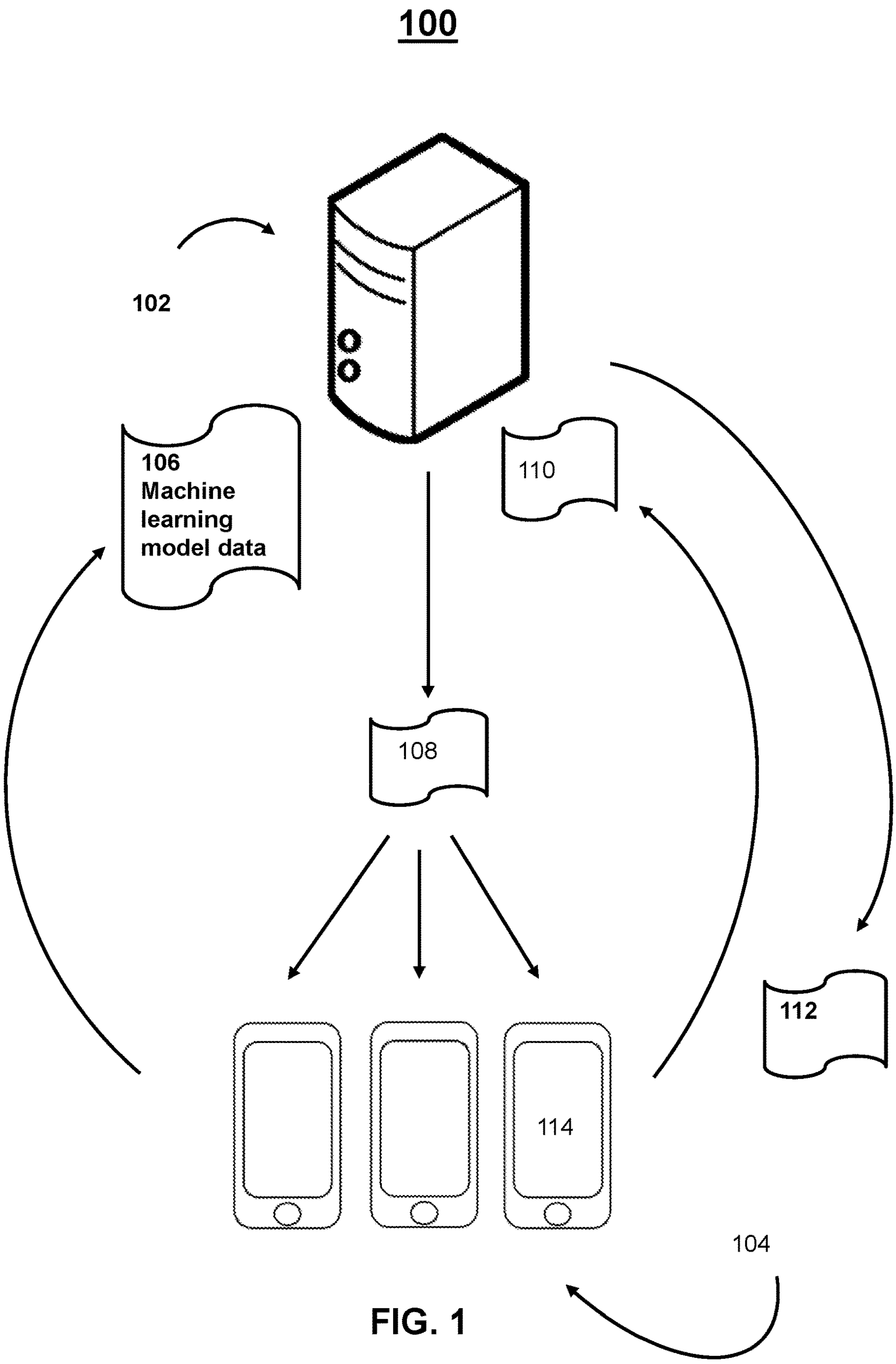
FIG. 1 shows an illustrative diagram for validating a machine learning model using federated machine learning process, in accordance with one or more embodiments.

FIG. 1 shows an illustrative diagram for validating a machine learning model using a federated machine learning process. For example, the validation environment 100 may include the validation system 102, a client device 114 within a plurality of client devices 104. The validation system 102 may execute instructions for validating a machine learning model using the federated learning process. The validation system 102 may include software, hardware, or a combination of the two. For example, the validation system 102 may be a physical server or a virtual server that is running on a physical computer system. In some embodiments, the validation system 102 may be a centralized server and may execute operations on a computer or processor.

The plurality of client devices 104 may include a user device (e.g., a laptop computer, a smartphone, a desktop computer, an electronic tablet, or another suitable user device). For example, the plurality of client devices may include client device 114.

The validation system 102 may receive from each of a plurality of client devices 104, a plurality of sets of machine learning model data 106. As referred to herein, "machine learning model data" may include updated model parameters resulting from training each machine learning model. In some embodiments, the machine learning model data may include an internal variable used in the algorithm from the machine learning model. In some embodiments, the machine learning model data may include the weights and coefficients that the algorithm extracts from the data. For example, the machine learning model data 106 is described further herein with reference to FIG. 2. FIG. 2 illustrates a table of exemplary machine learning model data 200 which includes model parameters 202 and values 204. Values 204 are associated with each model parameter of model parameters 202. The machine learning model data 106 may include model parameters 202. For example, each client device (e.g., laptop) may host a machine learning model. Some examples of machine learning models may include malicious code detection models, malicious message detection models, etc. Each laptop may have a machine learning model tuned to the data on that laptop. The validation system 102 may transmit a command to each laptop to train a corresponding machine learning model. Each laptop may train each corresponding machine learning model and transmit the results (e.g., model parameters updated as a result of training) to the validation system 102. Each laptop may store model parameters such that each parameter may correspond to a feature in the dataset stored on the laptop. For example, one parameter may include file type and the value may include the file format.

The validation system 102 may aggregate each set of the updated model parameters into an aggregated set of model parameters 108. As referred to herein, an "aggregated set of model parameters" may include a set of model parameters that were accumulated together after training the machine learning model at each client device 114. In some embodiments, the aggregated set of model parameters may include aggregated parameters generated based on an updated set of model parameters received from a plurality of client devices after training. For example, the aggregated set of model parameters 108 is described further herein with reference to FIG. 3. FIG. 3 then illustrates a data structure 300 used in aggregating model parameters, which includes updated model parameters 302, and aggregated parameter 304. For example, the validation system 102 may receive results (e.g., a set of machine learning model weights) from each of a thousand laptops, each running a machine learning model that detects malicious code. Updated model parameters 302 may include the device type and weight assigned to that feature. Aggregated parameter 304 may include the average weight assigned to the feature of device type.

The validation system 102 may receive updated model parameters 302 from the plurality of client devices 104. The validation system 102 may aggregate the updated model parameters 302 into aggregated parameter 304 by, for example, averaging the weight from updated model parameters 302. Aggregated parameter 304 is then to be used for updating the machine learning model. For example, aggregated parameter 304 is used to update the machine learning model stored on the client device (e.g., a laptop) when the validation system 102 transmits a command to each client device to update. In some embodiments, the weights may themselves be weighted based on a number of entries used in generating a particular weight. For example, a first client device may have a large amount of training and validation data (e.g., ten thousand entries) while a second client device may have a much smaller amount of training and validation data (e.g., one hundred entries). Thus, the validation system 102 may weight the parameters received from the first client device one hundred times higher than the parameters from the second client device. In some embodiments, the weights may be weighted in a different manner (e.g., based on importance of the particular client device).

The validation system 102 may cause each client device 114 to update a corresponding machine learning model using the aggregated set of model parameters 108. The validation system 102 may cause each of the plurality of client devices 104 to validate the machine learning model using a validation dataset. For example, the validation system 102 may request that each client device (e.g., laptop) validate a malicious code detection system residing on each device. That is, the validation system may instruct each device to test the new updated machine learning model. As referred to herein, a "validation dataset" may include sample of data held back from training a machine learning model that is used to validate the machine learning model. In some embodiments, the validation dataset may include data that is tagged for improving the machine learning models parameters. For example, the validation dataset is illustrated further with reference to FIG. 4.

For example, FIG. 4 illustrates a table of an exemplary training data 400 that may include a Boolean value for a flag 402 and data feature 404. As described herein, the validation system 102 may transmit a first command to split the training data into a training dataset and a validation dataset. For example, the validation system 102 may transmit to each of the plurality of client devices 104, a first command to split training data 400 into a training dataset and the validation dataset. The first command may include (1) a ratio of data to be assigned to the training dataset and the validation dataset and (2) a flag 402 for insertion into the training data 400 to mark a portion of the training data as validation data. For example, the validation system 102 may transmit a command to the plurality of client devices 104 to reserve a portion of the training data 400 to be used as a validation dataset and mark it as a validation dataset.

In some embodiments, the validation system 102 may transmit a second command to train the machine learning model. For example, the system may transmit to each client device 114 in the plurality of client devices 104, a second command to train the corresponding machine learning model using the training dataset. The second command may include the flag 402 for indicating the portion of the training data to skip during training. For example, the validation system 102 may transmit to each client device 114 a command to use flag 402 for a section of the training dataset to be used as a validation dataset when validating the machine learning model. For example, the validation system 102 may request that each client device 114 (e.g., laptop) split the data on the client device 114 into a training dataset and validation dataset by adding a flag to indicate what data to skip during training. The validation system 102 may receive a corresponding performance score 110 from each of the plurality of client devices 104. Each performance score indicates an accuracy level of the corresponding machine learning model. The performance score is illustrated further with reference to FIG. 5. For example, the validation system 102 may receive results from each client device how the machine learning model stored on each client device is performing.

For example, FIG. 5 illustrates a table 500 of an original performance score 504 used for comparing performance scores. As referred to herein, a "performance score" may include an indicator that measures the accuracy level of the machine learning model. In some embodiments, the performance score may include determining an error rate when validating the machine learning model. The performance score may include determining the overall accuracy metric when validating the machine learning model. In some embodiments, the validation system may transmit a request, to each of the plurality of client devices 104, for a corresponding original performance score (e.g., performance score 504). Each original performance score 504 may indicate a performance level of the corresponding machine learning model at the corresponding client devices (e.g., the plurality of client devices 104). The validation system may set, for each client device 114, the threshold to the corresponding performance score (e.g., performance score 504). The validation system may compare, for each client device of the plurality of client devices 104, the corresponding original performance score (e.g., performance score 504) with the corresponding performance score 110 for each client device. The original performance score 504 may be stored with a device identification number 502. The validation system may determine, for each client device 114, whether the corresponding performance score 110 is lower than the threshold.

In some embodiments, the validation system 102 may transmit a request for an original performance score 504. For example, the system may prior to receiving from the plurality of client devices 104, the plurality of sets of machine learning model data 106, transmit a request, to each of the plurality of client devices 104, for a corresponding original performance score (e.g., performance score 504). Each original performance score (e.g., performance score 504) may indicate a performance level of the corresponding machine learning model at the corresponding client device (e.g., client device 114). The system may set, for each client device 114, the threshold to the corresponding performance score (e.g., performance score 504). The system may compare, for each client device 114 of the plurality of client devices 104, the corresponding original performance score 504 with the corresponding performance score 110 for each client device 114 using device identification number 502, The system may determine, for each client device 114, whether the corresponding performance score 110 is lower than the threshold. For example, the validation system 102 may check the performance of the machine learning model stored on the client devices by comparing performance scores.

The validation system may in response to determining that the first machine learning model corresponding to the client device 114 is associated with the performance score 504 lower than the threshold, revert the machine learning model to an original set of model parameters 202. Referring back to FIG. 4, the validation system 102 may adjust the ratio between training and validation within the training data 400. For example, the validation system 102 may determine, for the client device 114 of the plurality of client devices 104, that an original performance score 504 is below a score threshold. The validation system 102 may in response to determining that the original performance score 504 is below the score threshold, adjust a ratio of data to be assigned to a training dataset to be higher to enlarge the training dataset and to reduce the validation dataset.

The validation system may in response to determining that a first machine learning model corresponding to a client device 114 is associated with a performance score 504 lower than a threshold, generate a notification 112 indicating of the client device 114.

Figure 6:
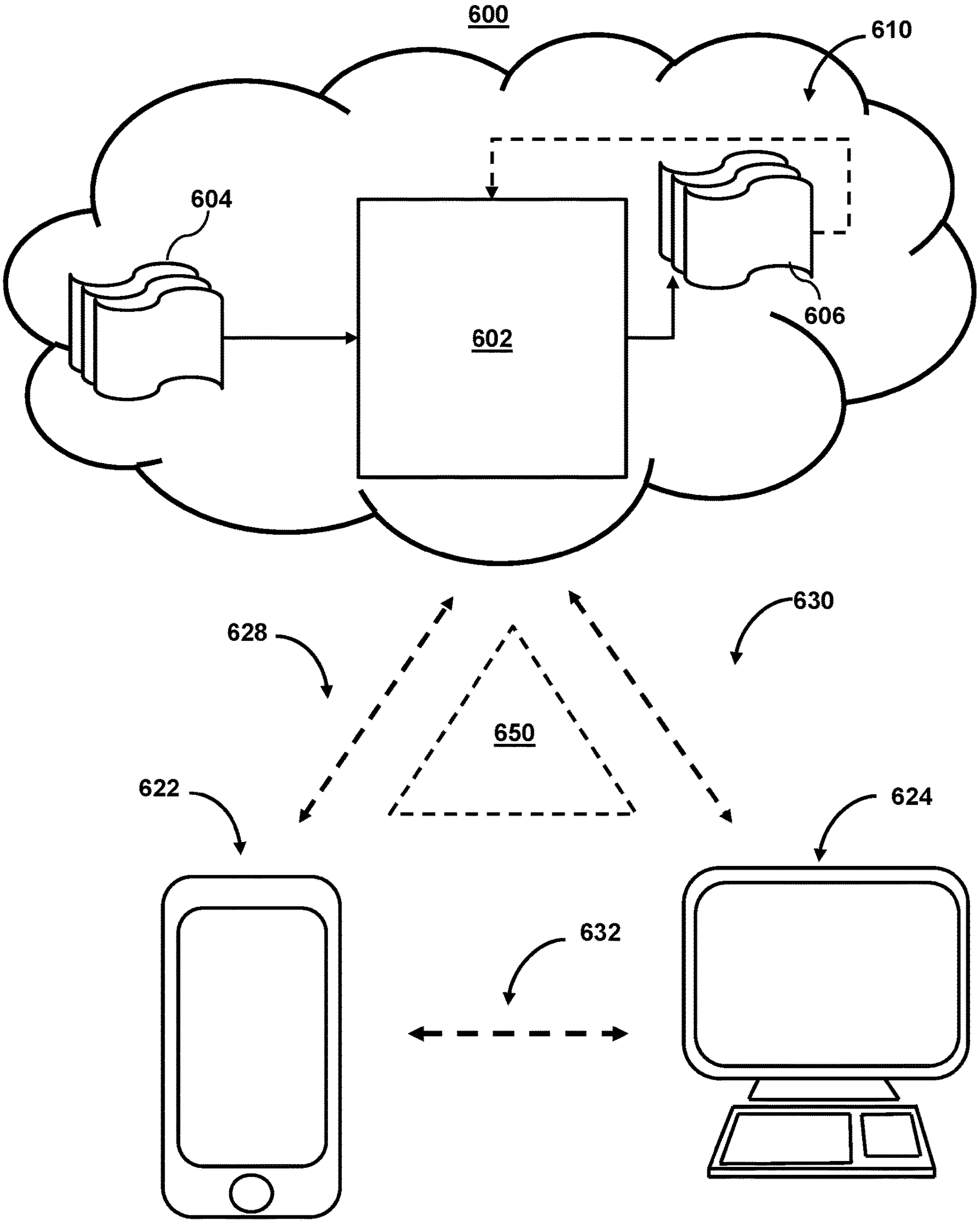
FIG. 6 shows illustrative components for a system used to improve privacy and processing efficiency at a central location of the federated machine learning process, in accordance with one or more embodiments.

FIG. 6 shows illustrative components for a system used to improve privacy and processing efficiency of validating an updated machine learning model during the federated machine learning process. For example, FIG. 6 may show illustrative components for validating a machine learning model using federated machine learning process. As shown in FIG. 6 system 600 may include mobile device 622 and user terminal 624. While shown as a smartphone and personal computer, respectively, in FIG. 6, it should be noted that mobile device 622 and user terminal 624 may be any computing device, including, but not limited to, a laptop computer, a tablet computer, a hand-held computer, and other computer equipment (e.g., a server), including "smart," wireless, wearable, and/or mobile devices. FIG. 6 also includes cloud components 610. Cloud components 610 may alternatively be any computing device as described above, and may include any type of mobile terminal, fixed terminal, or other device. For example, cloud components 610 may be implemented as a cloud computing system and may feature one or more component devices. It should also be noted that system 600 is not limited to three devices. Users may, for instance, utilize one or more devices to interact with one another, one or more servers, or other components of system 600. It should be noted, that, while one or more operations are described herein as being performed by particular components of system 600, these operations may, in some embodiments, be performed by other components of system 600. As an example, while one or more operations are described herein as being performed by components of mobile device 622, these operations may, in some embodiments, be performed by components of cloud components 610. In some embodiments, the various computers and systems described herein may include one or more computing devices that are programmed to perform the described functions. Additionally, or alternatively, multiple users may interact with system 600 and/or one or more components of system 600. For example, in one embodiment, a first user and a second user may interact with system 600 using two different components.

With respect to the components of mobile device 622, user terminal 624, and cloud components 610, each of these devices may receive content and data via input/output (hereinafter "I/O") paths. Each of these devices may also include processors and/or control circuitry to send and receive commands, requests, and other suitable data using the I/O paths. The control circuitry may include any suitable processing, storage, and/or input/output circuitry. Each of these devices may also include a user input interface and/or user output interface (e.g., a display) for use in receiving and displaying data. For example, as shown in FIG. 6, both mobile device 622 and user terminal 624 include a display upon which to display data (e.g., conversational response, queries, and/or notifications).

Additionally, as mobile device 622 and user terminal 624 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 600 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 6 also includes communication paths 628, 630, and 632. Communication paths 628, 630, and 632 may include the Internet, a mobile phone network, a mobile voice or data network (e.g., a 5G or LTE network), a cable network, a public switched telephone network, or other types of communications networks or combinations of communications networks. Communication paths 628, 630, and 632 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 610 may refer to the plurality of client devices. Each client device may include a machine learning model. Each cloud component of cloud components 610 may include model 602, which may be a machine learning model, artificial intelligence model, etc. (which may be referred to collectively as "models" herein). Model 602 may take inputs 604 and provide outputs 606. The inputs may include multiple datasets, such as a training dataset and a validation dataset. Each of the plurality of datasets (e.g., inputs 604) may include data subsets related to user data, predicted forecasts and/or errors, and/or actual forecasts and/or errors. In some embodiments, outputs 606 may be fed back to model 602 as input to train model 602 (e.g., alone or in conjunction with user indications of the accuracy of outputs 606, labels associated with the inputs, or with other reference feedback information). For example, the system may receive a first labeled feature input. The first labeled feature input is labeled with a known prediction for the first labeled feature input. The system may then train the first machine learning model.

In a variety of embodiments, model 602 may update its configurations (e.g., weights, biases, or other parameters) based on the assessment of its prediction (e.g., outputs 606) and reference feedback information (e.g., user indication of accuracy, reference labels, or other information). In a variety of embodiments, where model 602 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 602 may be trained to generate better predictions.

In some embodiments, model 602 may include an artificial neural network. In such embodiments, model 602 may include an input layer and one or more hidden layers. Each neural unit of model 602 may be connected with many other neural units of model 602. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 602 may be self-learning and trained, rather than explicitly programmed, and can perform significantly better in certain areas of problem solving, as compared to traditional computer programs. During training, an output layer of model 602 may correspond to a classification of model 602, and an input known to correspond to that classification may be input into an input layer of model 602 during training. During testing, an input without a known classification may be input into the input layer, and a determined classification may be output.

In some embodiments, model 602 may include multiple layers (e.g., where a signal path traverses from front layers to back layers). In some embodiments, back propagation techniques may be utilized by model 602 where forward stimulation is used to reset weights on the "front" neural units. In some embodiments, stimulation and inhibition for model 602 may be more free-flowing, with connections interacting in a more chaotic and complex fashion.

In some embodiments, the model (e.g., model 602) may automatically perform actions based on outputs 606. In some embodiments, the model (e.g., model 602) may not perform any actions. The output of the model (e.g., model 602) may be used to optimize the model.

System 600 also includes API layer 650. API layer 650 may allow the system to generate summaries across different devices. In some embodiments, API layer 650 may be implemented on a user device such as mobile device 622 or user terminal 624. Alternatively or additionally, API layer 650 may reside on one or more of cloud components 610. API layer 650 (which may be A REST or Web services API layer) may provide a decoupled interface to data and/or functionality of one or more applications. API layer 650 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 650 may use various architectural arrangements. For example, system 600 may be partially based on API layer 650, such that there is strong adoption of SOAP and RESTful Web-services, using resources like Service Repository and Developer Portal, but with low governance, standardization, and separation of concerns. Alternatively, system 600 may be fully based on API layer 650, such that separation of concerns between layers like API layer 650, services, and applications are in place.

In some embodiments, the system architecture may use a microservice approach. Such systems may use two types of layers: Front-End Layer and Back-End Layer where microservices reside. In this kind of architecture, the role of the API layer 650 may provide integration between Front-End and Back-End. In such cases, API layer 650 may use RESTful APIs (exposition to front-end or even communication between microservices). API layer 650 may use AMQP (e.g., Kafka, RabbitMQ, etc.). API layer 650 may use incipient usage of new communications protocols such as gRPC, Thrift, etc.

In some embodiments, the system architecture may use an open API approach. In such cases, API layer 650 may use commercial or open-source API Platforms and their modules. API layer 650 may use a developer portal. API layer 650 may use strong security constraints applying WAF and DDOS protection, and API layer 650 may use RESTful APIs as standard for external integration.

Figure 7:
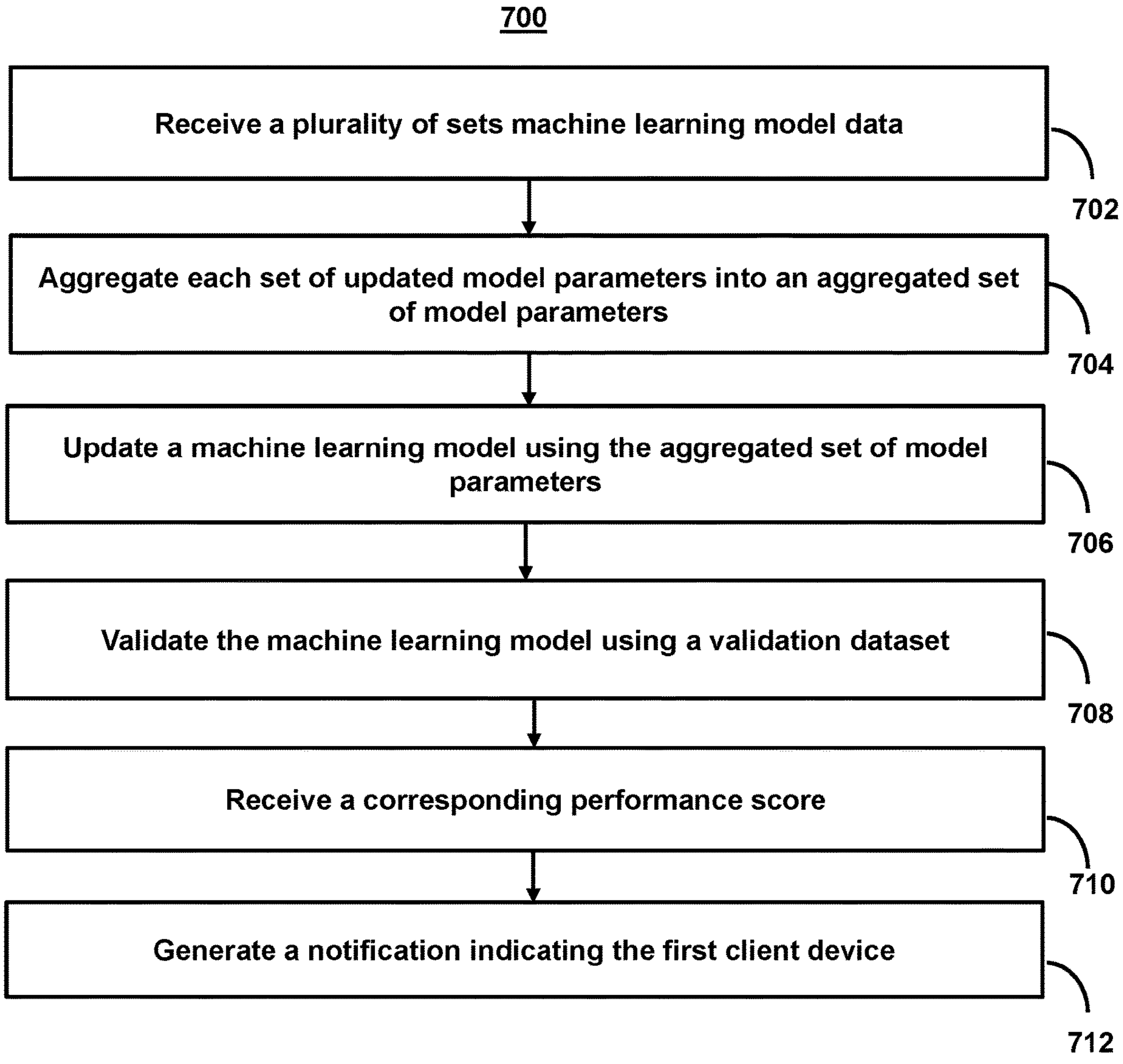
FIG. 7 shows a flowchart of the steps involved in validating a machine learning model using federated machine learning process, in accordance with one or more embodiments.

FIG. 7 shows a flowchart of operations involved in validating a machine learning model using federated machine learning process, in accordance with one or more embodiments. For example, the system may use process 700 (e.g., as implemented on one or more system components described above) in order to improve privacy and processing efficiency standards at a central location.

At 702, validation system 102 (e.g., using one or more components described above) receives a plurality of sets of machine learning model data. For example, the validation system 102 may receive the sets of machine learning model data 106 from a plurality of client devices 104. The machine learning model data in each set may include corresponding updated model parameters 302 resulting from training each machine learning model at a corresponding client device of the plurality of client devices 104. For example, the validation system 102 may receive results from the decentralized client devices after training the machine learning model. By doing so, the system may update the machine learning model to be more accurate. The validation system 102 may receive the plurality of machine learning model data using communication paths 628 and 630 from mobile device 622, and user terminal 624.

At 704, validation system 102 (e.g., using one or more components described above) aggregates each set of updated model parameters into an aggregated set of model parameters. For example, the validation system 102 may aggregate each set of the updated model parameters 302 into an aggregated set of model parameters (e.g., aggregated parameter 304). For example, the system may aggregate the model parameters received from the plurality of client devices and generate a new set of model parameters to send back to the client devices to validate the machine learning model. By doing so, the system may easily process and send the results from training to each client device without compromising user privacy. The validation system 102 may use one or more processors of cloud components 610 to perform this operation.

At 706, validation system 102 (e.g., using one or more components described above) updates a machine learning model using the aggregated set of model parameters. For example, the validation system 102 may cause each client device to update a corresponding machine learning model using the aggregated set of model parameters (e.g., aggregated parameter 304). For example, the system may send a request to the client devices to update the machine learning model using the aggregated set of model parameters. By doing so, the system may easily update the machine learning model using the aggregated set of model parameters. The validation system 102 may use one or more processors to perform this operation.

At 708, validation system 102 (e.g., using one or more components described above) validates the machine learning model using a validation dataset. For example, the validation system 102 may cause each of the plurality of client devices 104 to validate the machine learning model using a validation dataset. For example, the system may in response to receiving a confirmation from each of the plurality of client devices that the corresponding machine learning model has been updated, transmit a second request to each of the plurality of client devices to validate the machine learning model using a validation dataset. Each client device of the plurality of client devices may validate the corresponding machine learning model using a corresponding validation dataset. By doing so, the system may validate the updated machine learning model on each client device without violating a user's privacy. The validation system 102 may use communication paths 628, and 630, to transmit validation commands to client devices such as mobile device 622 and user terminal 624.

At 710, validation system 102 (e.g., using one or more components described above) receives a corresponding performance score. For example, the validation system 102 may receive a corresponding performance score 110 from each of the plurality of client devices 104. Each performance score (e.g., performance score 504) may indicate an accuracy level of the corresponding machine learning model. For example, the system may in response to the second request, receive a corresponding performance score from each of the plurality of client devices. Each performance score indicates an accuracy level of the corresponding machine learning model. By doing so, the system may evaluate the performance of the updated machine learning model. The validation system 102 may receive performance scores using communication paths 628 and 630 from mobile device 622 and user terminal 624.

At 712, validation system 102 (e.g., using one or more components described above) generates a notification indicating the first client device. For example, the validation system 102 may in response to determining that a first machine learning model corresponding to a first client device is associated with a performance score 504 lower than a threshold, generate a notification 112 indicating the first client device. In some embodiments, the validation system 102 may in response to determining that a first machine learning model corresponding to a first client device is associated with a performance score lower than a threshold, revert a corresponding set of updated model parameters to an original set of model parameters. By doing so, the system may optimize the machine learning model on each client device.

In some embodiments, the system may revert the machine learning model to an original set of model parameters. For example, the system may in response to determining that the first machine learning model corresponding to the first client device is associated with the performance score lower than the threshold, revert the machine learning model to an original set of model parameters. For example, the system may prior to receiving, from the plurality of client devices, the plurality of sets of machine learning model data, transmit a request, to each of the plurality of client devices, for a corresponding original performance score. Each original performance score may indicate a performance level of the corresponding machine learning model at the corresponding client device. The system may set, for each client device, the threshold to the corresponding performance score. The system may compare, for each client device of the plurality of client devices, the corresponding original performance score with the corresponding performance score for each client device. The system may determine, for each client device, whether the corresponding performance score is lower than the threshold. By doing so, the system may optimize the machine learning model on each client device.

In some embodiments, the system may select aggregated model parameters for the first client device. For example, the system may store for each client device of the plurality of client devices, a corresponding set of original performance scores and corresponding set of aggregated model parameters. The system may in response to determining that the first machine learning model corresponding to the first client device is associated with the performance score lower than the threshold, select a first set of aggregated model parameters for the first client device. The first set of aggregated model parameters may be associated with a highest original performance score. For example, the system may select a set of aggregated model parameters with the highest original performance score for the machine learning model on the decentralized client device. By doing so, the system may optimize the machine learning model on each client device by selecting the model parameters that are associated with the highest performance.

In some embodiments, the system may transmit a first command to split the training data into a training dataset and a validation dataset. For example, the system may transmit to each of the plurality of client devices, a first command to split training data into a training dataset and the validation dataset. The first command may include (1) a ratio of data to be assigned to the training dataset and the validation dataset (2) a flag for insertion into the training data to mark a portion of the training data as validation data. For example, the system may transmit a command to the decentralized client devices to reserve a portion of the training dataset to be used as a validation dataset and mark it as a validation dataset. By doing so, the system may create a dataset to validate the machine learning model.

In some embodiments, the system may transmit a second command to train the machine learning model. For example, the system may transmit to each client device in the plurality of client devices, a second command to train the corresponding machine learning model using the training dataset. The second command may include the flag for indicating the portion of the training data to skip during training. For example, the system may transmit to each decentralized client device a command to use the flag of a section of the training dataset to be used as a validation dataset when validating the machine learning model. By doing so, the system may create a dataset to validate the machine learning model.

In some embodiments, the system may transmit a request for an original performance score. For example, the system may prior to receiving, from the plurality of client devices, the plurality of sets of machine learning model data, transmit a request, to each of the plurality of client devices, for a corresponding original performance score. Each original performance score may indicate a performance level of the corresponding machine learning model at the corresponding client device. The system may set, for each client device, the threshold to the corresponding performance score. The system may compare, for each client device of the plurality of client devices, the corresponding original performance score with the corresponding performance score for each client device, The system may determine, for each client device, whether the corresponding performance score is lower than the threshold. For example, the system may evaluate the accuracy or performance of the machine learning model. By doing so, the system may have a metric to measure the performance of the machine learning model.

In some embodiments, the system may adjust the ratio between training and validation within the dataset. For example, the system may determine, for the first client device of the plurality of client devices, that a first original performance score is below a score threshold. The system may in response to determining that the first original performance score is below the score threshold, adjust a ratio of data to be assigned to a training dataset to be higher to enlarge the training dataset and to reduce the validation dataset. For example, the system may determine if the new performance score is lower than the previous performance score. By doing so, the system may ensure that the machine learning model is optimized for the plurality of client devices.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

The present techniques will be better understood with reference to the following enumerated embodiments:

1. A method for validating a machine learning model using federated machine learning process, the method comprising: receiving, from a plurality of client devices, a plurality of sets of machine learning model data, wherein the machine learning model data in each set comprises corresponding updated model parameters resulting from training each machine learning model at a corresponding client device of the plurality of client devices; aggregating each set of the updated model parameters into an aggregated set of model parameters; causing each client device to update a corresponding machine learning model using the aggregated set of model parameters; causing each of the plurality of client devices to validate the machine learning model using a validation dataset; receiving a corresponding performance score from each of the plurality of client devices, wherein each performance score indicates an accuracy level of the corresponding machine learning model; and in response to determining that a first machine learning model corresponding to a first client device is associated with a performance score lower than a threshold, generating a notification indicating the first client device.
2. The method of any one of the preceding embodiments, further comprising in response to determining that the first machine learning model corresponding to the first client device is associated with the performance score lower than the threshold, reverting the machine learning model to an original set of model parameters.
3. The method of any one of the preceding embodiments, further comprising transmitting, to each of the plurality of client devices, a first command to split training data into a training dataset and the validation dataset, wherein the first command comprises (1) a ratio of data to be assigned to the training dataset and the validation dataset (2) a flag for insertion into the training data to mark a portion of the training data as validation data.
4. The method of any one of the preceding embodiments, further comprising transmitting, to each client device in the plurality of client devices, a second command to train the corresponding machine learning model using the training dataset, wherein the second command comprises the flag for indicating the portion of the training data to skip during training.
5. The method of any one of the preceding embodiments, further comprising: prior to receiving, from the plurality of client devices, the plurality of sets of machine learning model data, transmitting a request, to each of the plurality of client devices, for a corresponding original performance score, wherein each original performance score indicates a performance level of the corresponding machine learning model at the corresponding client device; setting, for each client device, the threshold to the corresponding performance score; comparing, for each client device of the plurality of client devices, the corresponding original performance score with the corresponding performance score for each client device; and determining, for each client device, whether the corresponding performance score is lower than the threshold.
6. The method of any one of the preceding embodiments, further comprising: determining, for the first client device of the plurality of client devices, that a first original performance score is below a score threshold; and in response to determining that the first original performance score is below the score threshold, adjusting a ratio of data to be assigned to a training dataset to be higher to enlarge the training dataset and to reduce the validation dataset.
7. The method of any one of the preceding embodiments, further comprising transmitting a request to the first client device to train the machine learning model, wherein the request comprises a ratio of training data to be used in a training dataset and the validation dataset.
8 The method of any one of the preceding embodiments, further comprising: storing, for each client device of the plurality of client devices, a corresponding set of original performance scores and corresponding set of aggregated model parameters; and in response to determining that the first machine learning model corresponding to the first client device is associated with the performance score lower than the threshold, selecting a first set of aggregated model parameters for the first client device, wherein the first set of aggregated model parameters is associated with a highest original performance score.
9. A tangible, non-transitory, machine-readable medium storing instructions that, when executed by a data processing apparatus, cause the data processing apparatus to perform operations comprising those of any of embodiments 1-8.
10. A system comprising one or more processors; and memory storing instructions that, when executed by the processors, cause the processors to effectuate operations comprising those of any of embodiments 1-8.
11. A system comprising means for performing any of embodiments 1-8.

What is claimed is:

1. A system for validating a machine learning model using federated machine learning process, the system comprising:

one or more processors; and a non-transitory computer-readable storage medium storing instructions, which when executed by the one or more processors cause the one or more processors to perform operations comprising:

receiving, from a plurality of client devices, a plurality of sets of machine learning model data, wherein the machine learning model data in each set comprises corresponding updated model parameters resulting from training each machine learning model at a corresponding client device of the plurality of client devices using a training dataset stored at each corresponding client device of the plurality of client devices;

in response to receiving the plurality of sets of the machine learning model data, combining each set of the updated model parameters into an aggregated set of model parameters;

transmitting to each client device a first request to update a corresponding machine learning model using the aggregated set of model parameters;

in response to receiving a confirmation from each of the plurality of client devices that the corresponding machine learning model has been updated, transmitting a second request to each of the plurality of client devices to validate the machine learning model using a validation dataset, wherein each client device of the plurality of client devices validates the corresponding machine learning model using a corresponding validation dataset generated on each client device;

in response to the second request, receiving a corresponding performance score from each of the plurality of client devices, wherein each performance score indicates an accuracy level of the corresponding machine learning model; and in response to determining that a first machine learning model corresponding to a first client device is associated with a performance score lower than a threshold, reverting a corresponding set of updated model parameters to an original set of model parameters.

2. The system of claim 1, wherein the instructions cause the one or more processors to transmit, to each of the plurality of client devices, a first command to split training data into the training dataset and the validation dataset, wherein the first command comprises (1) a ratio of data to be assigned to the training dataset and the validation dataset and (2) a flag for insertion into the training data to mark a portion of the training data as validation data.

3. The system of claim 2, wherein the instructions cause the one or more processors to transmit, to each client device in the plurality of client devices, a second command to train the corresponding machine learning model using the training dataset, wherein the second command comprises the flag for indicating the portion of the training data to skip during training.

4. The system of claim 1, wherein the instructions cause the one or more processors to perform operations comprising:

prior to receiving, from the plurality of client devices, the plurality of sets of machine learning model data, transmitting a request, to each of the plurality of client devices, for a corresponding original performance score, wherein each original performance score indicates a performance level of the corresponding machine learning model at the corresponding client device;

setting, for each client device, the threshold to the corresponding performance score;

comparing, for each client device of the plurality of client devices, the corresponding original performance score with the corresponding performance score for each client device; and determining, for each client device, whether the corresponding performance score is lower than the threshold.

5. A method for validating a machine learning model using federated machine learning process, the method comprising:

receiving, from a plurality of client devices, a plurality of sets of machine learning model data, wherein the machine learning model data in each set comprises corresponding updated model parameters resulting from training each machine learning model at a corresponding client device of the plurality of client devices;

aggregating each set of the updated model parameters into an aggregated set of model parameters;

causing each client device to update a corresponding machine learning model using the aggregated set of model parameters;

receiving, from the plurality of client devices, confirmations that the corresponding machine learning model has been updated;

causing, after receiving the confirmations that the corresponding machine learning model has been updated each of the plurality of client devices to validate the machine learning model using a validation dataset on each client device;

receiving a corresponding performance score from each of the plurality of client devices, wherein each performance score indicates an accuracy level of the corresponding machine learning model; and in response to determining that a first machine learning model corresponding to a first client device is associated with a performance score lower than a threshold, generating a notification indicating the first client device.

6. The method of claim 5, further comprising in response to determining that the first machine learning model corresponding to the first client device is associated with the performance score lower than the threshold, reverting the machine learning model to an original set of model parameters.

7. The method of claim 5, further comprising transmitting, to each of the plurality of client devices, a first command to split training data into a training dataset and the validation dataset, wherein the first command comprises (1) a ratio of data to be assigned to the training dataset and the validation dataset (2) a flag for insertion into the training data to mark a portion of the training data as validation data.

8. The method of claim 7, further comprising transmitting, to each client device in the plurality of client devices, a second command to train the corresponding machine learning model using the training dataset, wherein the second command comprises the flag for indicating the portion of the training data to skip during training.

9. The method of claim 5, further comprising:

prior to receiving, from the plurality of client devices, the plurality of sets of machine learning model data, transmitting a request, to each of the plurality of client devices, for a corresponding original performance score, wherein each original performance score indicates a performance level of the corresponding machine learning model at the corresponding client device;

setting, for each client device, the threshold to the corresponding performance score;

comparing, for each client device of the plurality of client devices, the corresponding original performance score with the corresponding performance score for each client device; and determining, for each client device, whether the corresponding performance score is lower than the threshold.

10. The method of claim 9, further comprising:

determining, for the first client device of the plurality of client devices, that a first original performance score is below a score threshold; and in response to determining that the first original performance score is below the score threshold, adjusting a ratio of data to be assigned to a training dataset to be higher to enlarge the training dataset and to reduce the validation dataset.

11. The method of claim 5, further comprising transmitting a request to the first client device to train the machine learning model, wherein the request comprises a ratio of training data to be used in a training dataset and the validation dataset.

12. The method of claim 5, further comprising:

storing, for each client device of the plurality of client devices, a corresponding set of original performance scores and corresponding set of aggregated model parameters; and in response to determining that the first machine learning model corresponding to the first client device is associated with the performance score lower than the threshold, selecting a first set of aggregated model parameters for the first client device, wherein the first set of aggregated model parameters is associated with a highest original performance score.

13. One or more non-transitory, computer-readable storage media storing instructions that when executed by one or more processors cause the one or more processors to perform operations comprising:

receiving, from a client device, updated model parameters resulting from training a machine learning model at the client device;

aggregating the updated model parameters with other updated model parameters from other client devices into an aggregated set of model parameters;

causing the client device to update the machine learning model using the aggregated set of model parameters;

causing, after the client device confirms that the machine learning model has been updated, the client device to validate the machine learning model using a validation dataset, wherein the validation dataset is stored on the client device, and wherein the validation dataset is a portion of a training dataset not used in training the machine learning model;

receiving a performance score from the client device, wherein the performance score indicates an accuracy level of the machine learning model; and in response to determining that the performance score is lower than a threshold, generating a notification indicating the client device.

14. The one or more non-transitory, computer-readable storage media of claim 13, wherein the instructions further cause the one or more processors to, in response to determining that the machine learning model corresponding to the client device is associated with the performance score lower than the threshold, reverting the machine learning model to an original set of model parameters.

15. The one or more non-transitory, computer-readable storage media of claim 13, wherein the instructions further cause the one or more processors to transmit, to each of a plurality of client devices, a first command to split training data into the training dataset and the validation dataset, wherein the first command comprises (1) a ratio of data to be assigned to the training dataset and the validation dataset (2) a flag for insertion into the training data to mark the portion of the training data as validation data.

16. The one or more non-transitory, computer-readable storage media of claim 15, wherein the instructions further cause the one or more processors to transmit, to each client device of the plurality of client devices, a second command to train a corresponding machine learning model using the training dataset, wherein the second command comprises the flag for indicating the portion of the training data to skip during training.

17. The one or more non-transitory, computer-readable storage media of claim 13, wherein the instructions further cause the one or more processors to perform operations comprising:

prior to receiving, from a plurality of client devices, a plurality of sets of machine learning model data, transmitting a request, to each of the plurality of client devices, for a corresponding original performance score, wherein each original performance score indicates a performance level of a corresponding machine learning model at a corresponding client device;

setting, for each client device, the threshold to the corresponding original performance score;

comparing, for each client device of the plurality of client devices, the corresponding original performance score with the corresponding original performance score for each client device; and determining, for each client device, whether the corresponding original performance score is lower than the threshold.

18. The one or more non-transitory, computer-readable storage media of claim 17, wherein the instructions further cause the one or more processors to perform operations comprising:

determining, for the client device, that a first original performance score is below a score threshold; and in response to determining that the first original performance score is below the score threshold, adjusting a ratio of data to be assigned to a training dataset to be higher to enlarge the training dataset and to reduce the validation dataset.

19. The one or more non-transitory, computer-readable storage media of claim 13, wherein the instructions cause the one or more processors to transmit a request to the client device to train the machine learning model, wherein the request comprises a ratio of training data to be used in the training dataset and the validation dataset.

20. The one or more non-transitory, computer-readable storage media of claim 13, wherein the instructions cause the one or more processors to perform operations comprising:

storing, for each client device of a plurality of client devices, a corresponding set of original performance scores and corresponding set of aggregated model parameters; and in response to determining that the machine learning model corresponding to the client device is associated with the performance score lower than the threshold, selecting a first set of aggregated model parameters for the client device, wherein the first set of aggregated model parameters is associated with a highest original performance score.

* * * * *